US010395295B2

(12) United States Patent
Warren et al.

(10) Patent No.: US 10,395,295 B2
(45) Date of Patent: Aug. 27, 2019

(54) INCREMENTAL PARTIAL TEXT SEARCHING IN ECOMMERCE

(71) Applicant: GroupBy Inc., Toronto (CA)

(72) Inventors: Will Warren, Toronto (CA); Roland Gossage, Toronto (CA)

(73) Assignee: GroupBy Inc., Verdun (CA)

( * ) Notice: Subject to any disclaimer, the term of this patent is extended or adjusted under 35 U.S.C. 154(b) by 850 days.

(21) Appl. No.: 14/639,439

(22) Filed: Mar. 5, 2015

(65) Prior Publication Data

US 2015/0310526 A1 Oct. 29, 2015

Related U.S. Application Data

(63) Continuation-in-part of application No. 14/227,998, filed on Mar. 27, 2014, now Pat. No. 9,672,552.

(51) Int. Cl.
*G06Q 30/00* (2012.01)
*G06Q 30/06* (2012.01)
(Continued)

(52) U.S. Cl.
CPC ....... *G06Q 30/0625* (2013.01); *G06F 16/248* (2019.01); *G06F 16/951* (2019.01); *G06Q 30/0623* (2013.01)

(58) Field of Classification Search
CPC ......... G06Q 30/06–0645; G06Q 30/08; G06Q 50/01; G06F 16/248; G06F 16/951
See application file for complete search history.

(56) References Cited

U.S. PATENT DOCUMENTS 5,404,507 A * 4/1995 Bohm ............... G06F 17/30654
7,831,584 B2 * 11/2010 Rothman .......... G06F 17/30867
707/706

(Continued)

OTHER PUBLICATIONS

Anonymous, "Method and Apparatus for Mobile Information Retrieval on the Open Web," IP.com, No. IPCOM000203108D, Jan. 19, 2011, 6pp. (Year: 2011).*

*Primary Examiner* — Adam L Levine
(74) *Attorney, Agent, or Firm* — Gowling WLG (Canada) LLP

(57) ABSTRACT

A method for optimizing identification and access to product records in a product database, the method executed as a set of stored instructions by a computer processor to implement the steps of: receiving over a communications network textual information representing a potential portion of multiple different words or phrases, the textual information being a sequence of characters; searching metadata of each of a set of product listings stored in the product database for one or more of said multiple different words or phrases in the metadata matching the sequence of characters by having the sequence of characters included as a portion of the one or more of said multiple different words or phrases; executing a search query against the set of product listings using the one or more of said multiple different words or phrases to return a query search result containing a plurality of product listings matching the search query; selecting a product listing subset from the query search result, each product listing in the product listing subset associated with respective said metadata containing the sequence of characters; sending over the communications network the product listing subset for display on a user interface as a list of user selectable links, each of the user selectable links in the list for each said product listing coupled to a respective product record of the product records; and receiving over the com- (Continued)

munications network a link selection from the list of user selectable links and returning the respective product record associated with the link selection.

15 Claims, 5 Drawing Sheets

(51) Int. Cl.
*G06F 16/248* (2019.01)
*G06F 16/951* (2019.01)

(56) References Cited

U.S. PATENT DOCUMENTS

| | | | |
|---|---|---|---|
| 9,183,261 B2* | 11/2015 | Smiling | G06F 16/90324 |
| 9,990,441 B2* | 6/2018 | Hazra | G06F 16/90324 |
| 2008/0040323 A1* | 2/2008 | Joshi | G06F 16/951 |
| 2012/0059849 A1* | 3/2012 | Yehaskel | G06F 17/30722 |
| | | | 707/772 |

* cited by examiner

INCREMENTAL PARTIAL TEXT SEARCHING IN ECOMMERCE

FIELD OF THE INVENTION

This invention relates to product search and retrieval in ecommerce.

BACKGROUND OF THE INVENTION

Ecommerce is regarded as the sales aspect of e-business. Ecommerce needs well executed e-tailing or virtual storefronts in order to facilitate access by consumers (e.g. users, shoppers, etc.) to online catalogs or product inventory. On-line or network access to a merchant's product inventory is typically done by consumers to directly buy goods or services from a seller over the network (e.g. Internet) using a web browser. The manner in which the consumer is able to quickly navigate to their product/service of choice on the seller's website will dictate, to a large extent, the ability of the seller to execute the product/service sales transaction.

An online storefront can facilitate business-to-consumer (B2C) and business-to-business (B2B) online shopping, depending upon the targeted user of the online shop. With the growth of online shopping, comes a wealth of new market opportunities for stores that can appropriately cater to market demands and service requirements, however consumers still expect the ability to efficiently find online the products they are looking for amongst all of the various types and variations of products available. Like traditional physical stores, the ability of online stores to quickly and efficiently present consumers with consumer desired product selections and descriptions greatly enhances the online store's desired goal of converting consumer product interest into product sales.

One critical tool used by online shoppers to find a product of interest amongst the website of the retailer directly, or by searching among alternative vendors, is a shopping search engine interface. Only once a particular product has been found and selected on the website of the seller, can the consumer use a shopping cart to accumulate multiple items and to adjust quantities, with an associated "checkout" process. The access to and execution of the search engine by the online shop needs to handle the effects of information load, or overload, as the product information environment presented to the user via the search engine can provide additional product information such as comparative products and services, as well as various alternatives and attributes of each alternative (e.g. variants). This product information presented to the user by the search engine must describe products for sale with text, photos, and multimedia files that are considered relevant to the consumer in response to their product search query, otherwise the user may quickly lose interest in the online shop and may gravitate to another online shop with a better executed product information presentation experience. The online store must make sure that it's easy for the purchaser to get the product information they're likely to want in response to their search queries, rather than purchaser deemed irrelevant, useless or wrong information. Accordingly, the online shopping experience (and return online experience) of the user, as facilitated via the browser through the website search engine, should provide the consumer with access to product information and merchant information (e.g. shipping, store location, etc.) that is perceived by the consumer as ease of use and presence of user-friendly features.

Further, research has shown that many consumers will not buy from websites that they do not trust. What's more, site aesthetics, i.e. how good the web store looks, ease of desired product identification, and/or ease of site navigation, can be the most important factor(s) contributing to how shoppers judge the merchant's professionalism and trustworthiness. A disadvantage with current eCommerce websites is the presentation via inefficiently configured search engine interfaces that return endless pages of product grids containing product items that are mostly irrelevant to the consumer search. Consumers desire a search engine configured with a means to sort and filter category pages and search results in order to return relevant search results to a consumers' search/navigation query submitted to the search engine, as well as providing ease of access to purchase those products desired by the consumer.

SUMMARY OF THE INVENTION

The systems and methods disclosed herein provide for product search and retrieval to obviate or mitigate at least some of the above presented disadvantages.

A disadvantage with current eCommerce websites is the presentation via inefficiently configured search engine interfaces that return endless pages of product grids containing product items that are mostly irrelevant to the consumer search. Consumers desire a search engine configured with a means to sort and filter category pages and search results in order to return relevant search results to a consumers' search/navigation query submitted to the search engine, as well as providing ease of access to purchase those products desired by the consumer.

According to one aspect there is provided a method for optimizing identification and access to product records in a product database, the method executed as a set of stored instructions by a computer processor to implement the steps of: receiving over a communications network textual information representing a potential portion of multiple different words or phrases, the textual information being a sequence of characters; searching metadata of each of a set of product listings stored in the product database for one or more of said multiple different words or phrases in the metadata matching the sequence of characters by having the sequence of characters included as a portion of the one or more of said multiple different words or phrases; executing a search query against the set of product listings using the one or more of said multiple different words or phrases to return a query search result containing a plurality of product listings matching the search query; selecting a product listing subset from the query search result, each product listing in the product listing subset associated with respective said metadata containing the sequence of characters; sending over the communications network the product listing subset for display on a user interface as a list of user selectable links, each of the user selectable links in the list for each said product listing coupled to a respective product record of the product records; and receiving over the communications network a link selection from the list of user selectable links and returning the respective product record associated with the link selection.

A further aspect provided is prior to receiving the link selection: receiving a content update to the textual information; searching the metadata of each of the set of product listings based on the content update to update the one or more of said multiple different words or phrases in the metadata matching the content update included as a portion of said update the one or more of said multiple different words or phrases; re-executing the search query against the set of product listings using said update the one or more of said multiple different words or phrases to return an updated query search result containing an updated plurality of product listings matching the updated search query; selecting an updated product listing subset from the updated query search result, each product listing in the updated product listing subset associated with the content update to the textual information; sending over the communications network the updated product listing subset for replacing on the display the list of user selectable links with an updated list of user selectable links, each of the user selectable links in the updated list for each said product listing in the updated product listing subset coupled to a respective product record of the product records; and receiving over the communications network said link selection from the updated list of user selectable links and returning the respective product record associated with said link selection.

BRIEF DESCRIPTION OF THE DRAWINGS

Exemplary embodiments of the invention will now be described in conjunction with the following drawings, by way of example only, in which.

DETAILED DESCRIPTION OF THE PREFERRED EMBODIMENT(S)

Figure 1:
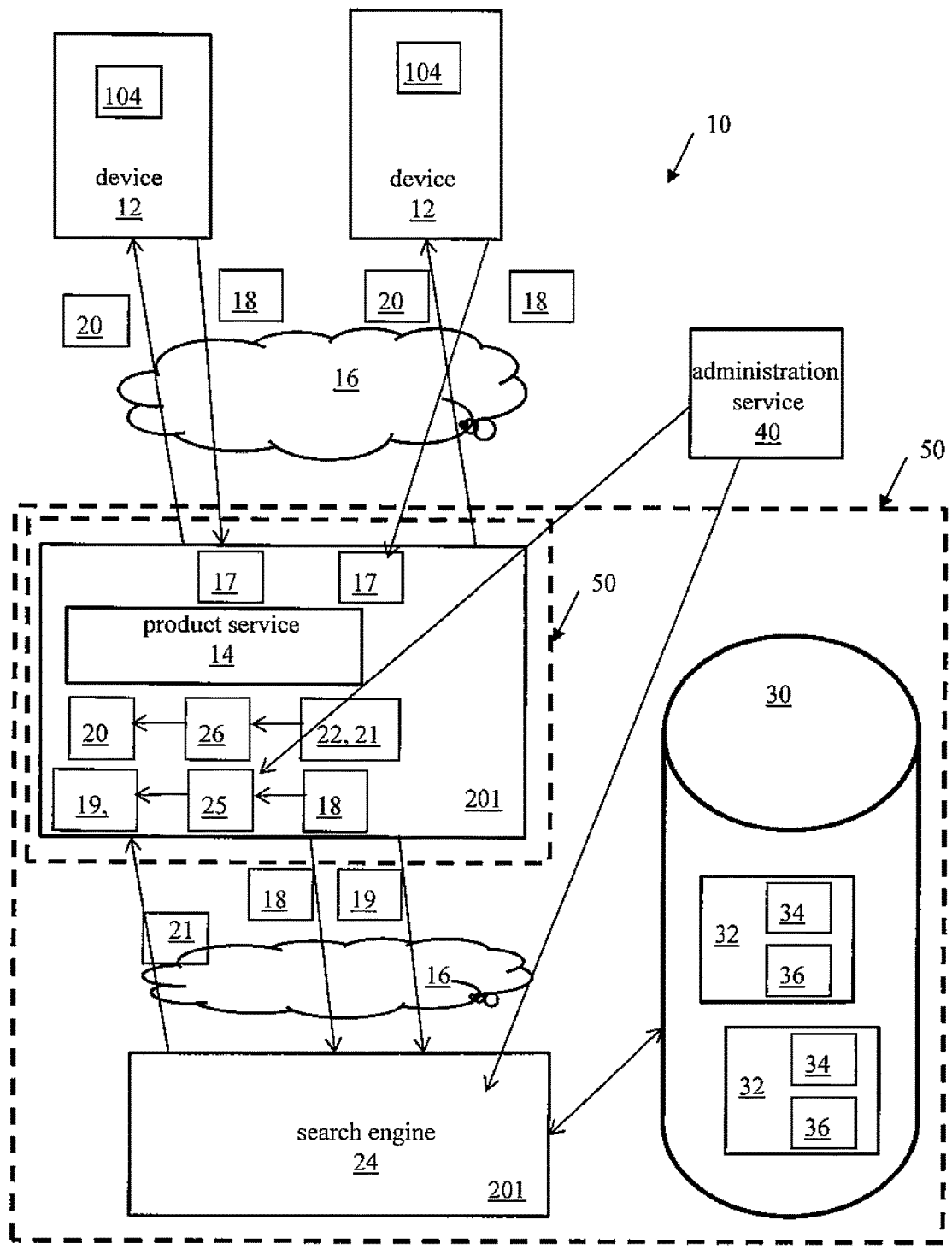
FIG. 1 is a view of a network system for facilitating item retrieval.

Referring to FIG. 1, shown is an item search retrieval system 10 including one or more network devices 12 coupled to a product service 14 (e.g. a retailer's ecommerce website hosted on a server) via a communications network 16. The product service 14 receives product based query requests 18 (including search text as query content 40—see FIG. 2) from the network devices 12 (e.g. via a browser application executing on the devices 12) and sends appropriately configured query responses 20 back to the network device(s) 12 (e.g. for presentation on the user interface 104 of the device—for example using the browser application), containing product information 22 received from a search engine 24. The query responses 20 can also contain search term suggestions 41 (see FIG. 2), based on the query content 40, for selection/use by the device 12 user as a supplemental query requests 18. The search engine 24 obtains the product information 22 from object records 32 in the form of a product index stored in product storage 30 (e.g. database), based on a comparison for relevancy of the query content 40 (or search term suggestions 41) against the product records 32 of the product index. The query responses 20 can also contain product summary links 23 providing both summary product definitions containing both words or phrases or terms (e.g. descriptive metadata) 44 and at least one representative image 46 representative of a respective product defined by the descriptive metadata 44. In other words each product summary link 23 can have both summary descriptive metadata 44 of a particular product as well as a product image 46 representative of the descriptive metadata 44. As further described below, the product summary links 23 can represent a direct link to the corresponding full product record 32 in the product storage 30. It is recognised that the product summary link 23 can be referred to as an abridged or partial version of the full product record 32 and as such the content of the summary descriptive metadata 44 of a particular product as well as the product image 46 can be an abridged or partial version of full descriptive metadata 34 of the particular product as well as the full product image(s) 36 contained in the product record 32 for the product represented by the each product summary link 23.

The query content 40 (and search term suggestions 41) is/are continuously updated using incremental search techniques, used to implement continually updated product links 23 and/or search term suggestions 41 reflecting incremental changes to the query content 40. These incremental changes to the query content 40 are entered by the device 12 user via the user interface 104 of the device 12. One example of incremental search techniques is Search as you Type (SayT). As further described below, the search term suggestions 41 and/or the product links 23 can contain the query content 40 as a content portion 43 (e.g. text) of the search term suggestions 41 and/or the product links 23. For example, referring to FIG. 2, the query content 40 "ten" is included as the portion 43 of the search term suggestions 41 "tents", "Eureka tent", etc. It is also recognised that the search term suggestion 41 "shelters" does not contain explicitly the query content 40 "ten" as a portion 43, rather the search term suggestion 41 is a suggested alternative or synonym of the term "tent" which does contain the query content 40 as the portion 43. Similarly, it is recognised that the representative descriptors "Product 1", "Product 2", "Product 3" can contain query content 40 as the content portion 43 therein (e.g. Product 1 can include descriptive product detail of "4 Person Tent Fly").

In terms of the content contained in the product information 22, this content is stored in the product index (e.g. records 32) such as but not limited to product master records (e.g. labelled shirt with generic shirt description and picture/image) and/or product variant records (e.g. labelled blue shirt, red shirt, size 6 shirt, polo shirt, short sleeve shirt with specific variant related description and specific variant relevant picture/image). As such, the product records 32 contain descriptive content (e.g. product information 22 including product defining multimedia content) of the individual products which are matched against the query content 40 of the query requests 18. The product records 32 can represent various product definitions containing both words or phrases or terms (e.g. descriptive metadata) 34 and at least one representative image 36 representative of a respective product defined by the descriptive metadata 34. In other words each object record 32 has both descriptive metadata 34 of a particular product as well as a product image 36 representative of the descriptive metadata 34, for example including a master record 32 and a number of variant records 32 of the product contained in different or combined object records 32. For example, the object record 32 can represent a pair of blue jeans, such that the descriptive metadata 34 can contain descriptors for "jeans", pricing, specified colour(s) such as red or black, specified size(s), specified style(s) such as boot cut or skinny, specified in stock status, etc. Also included in the object record 32 would be a representative image 36 of the blue jeans as the product. For example, the object record 32 for a red pair of blue jeans would have a picture 36 of a red coloured jeans, an object record 32 for a pair of boot cut jeans can have an image 36 of a standard dark blue jeans image of a boot cut style. As such, it is recognised that systematic searching through the object records 32 by the search engine 24 can provide for item/product search and retrieval in a variant product space.

The product service 14 can forward any query requests 18 received from the devices 12 to the search engine 24 (e.g. via the communications network 16), including the ability to reformat (e.g. suggest alternative spellings, synonyms, alternative product choices, etc.) the query content 40 before sending to the search engine 24. The product service 14 can format/reformat the product information 22 obtained from the search engine 24 based on one or more predefined formats 26 (e.g. based on rules, etc.), configured for presentation of the product information 22 on a user interface 104 (see FIG. 4) of the network device(s) 12 as the query response 20, in order to provide product search and retrieval information 22 in the form of the incremental search (e.g. SayT) interaction between the product service 14 and the devices 12 (e.g. client-server interactions between the browser application of the device and web service application of the product service 14). It is recognised that SayT can be regarded as a form of incremental search, further described below, whereby real time suggestions for search terms 41 are presented to the consumer by the product service 14 based on analysis of a portion of the search term(s) entered (e.g. typed) so far (contained in the query requests 18) by the consumer using a user interface (of the device 12) connected to the search engine 24 (via the product service 14) over the communications network 16.

The item search retrieval system 10 facilitates the application of the multiple incremental queries 18 (or modified/augmented versions as further described below) by the search engine 24 (e.g. Elastic Search, Google Search Appliance, and other readily available search engines) to provide meaningful content (e.g. product information 22) for the purpose of supporting eCommerce websites (those in contact with or otherwise facilitating operation of the network devices 12 generating the queries 18). These methods implemented by the product service 14, the search engine 24, and/or the product service 14 in combination with the search engine 24) provide for intelligent generation of continually updated product information 22 provided to the devices 12, using a set of incremental queries (e.g. multiple queries) based on the continually updated query 18 incremental content received from the network device 12. The set of incremental queries (e.g. including one or more generated augmented queries 19 further described below) are relevant to the searchable content stored in the product index as records 32 in the storage 30 accessible to the search engine 24. As further described below, the product service 14 intercepts the continually updated queries 18 and, based on comparison of the queries 18 against one or more rules 25 (e.g. stored in a storage such as a database accessible to the product service 14), can apply the queries 18 against the search engine 24 and resultantly to the product search index stored in the storage 30.

Figure 2:
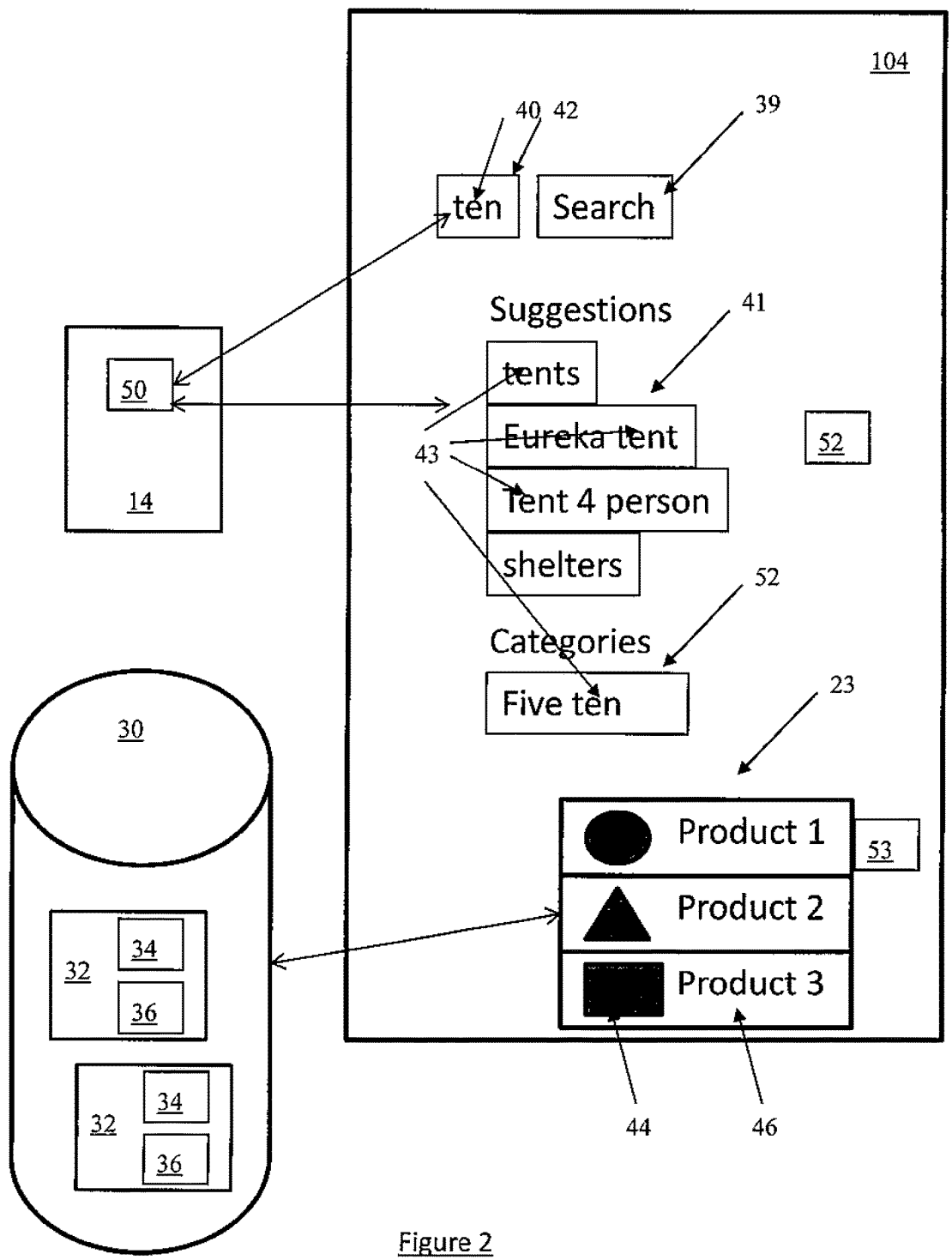
FIG. 2 shows an operational example of the system of FIG. 1.

Referring to FIG. 2, incremental search, incremental find or real-time suggestions (e.g. SayT) of the item search retrieval system 10 is configured as a user interface 104 interaction method to progressively search for and filter through a search query 18 (e.g. text string) as the user enters portions of the query content 40 (e.g. text) into the user interface 104 (e.g. via text box 42 and associated search action control 39). For each portion of the query content 40 entered into the user interface 104, the product service 14 references a content storage 50 for one or more possible matches for the query content 40 are found and immediately presented to the user interface 104 as search term suggestions 41 deemed to be match the received query content 40 identified in the content storage 50. This immediate feedback for the return of the search term suggestions 41 based on the user only entering a portion of the query content 40 submitted as the search query 18 often allows the user to stop short of typing the entire word or phrase of the query content 40 they were looking for. The user may also choose a closely related option from any presented lists or other selections provided in the search term suggestions 41, as further described below. As such, the search term suggestions 41 can be referred to as dynamically presented suggestions and/or auto-complete content based on the query content 40 before the user is even done typing.

Further, the product service 14 can implement at least some of the search term suggestions 41 by sending them to the search engine 24 for execution against the product records 32 of the storage 30 prior to selection of the search term suggestions 41 by the user. Upon receipt of product information 22 from the search engine 24 resulting from executing the search term suggestions 41, the product service 14 can select (e.g. filter) a subset of the product information 22 and send to the device 12 in the query response 20 as one or more product summary links 23 (see FIG. 2). In other words, each of the product summary links 23 represents only a portion of the full listing of product information 22 obtained from the search engine 24 as a result of executing the search term suggestions 41 against the product records 32. In this manner, the product service 14 can act as an intermediary between the network device 12 and the search engine 24.

Figure 3:
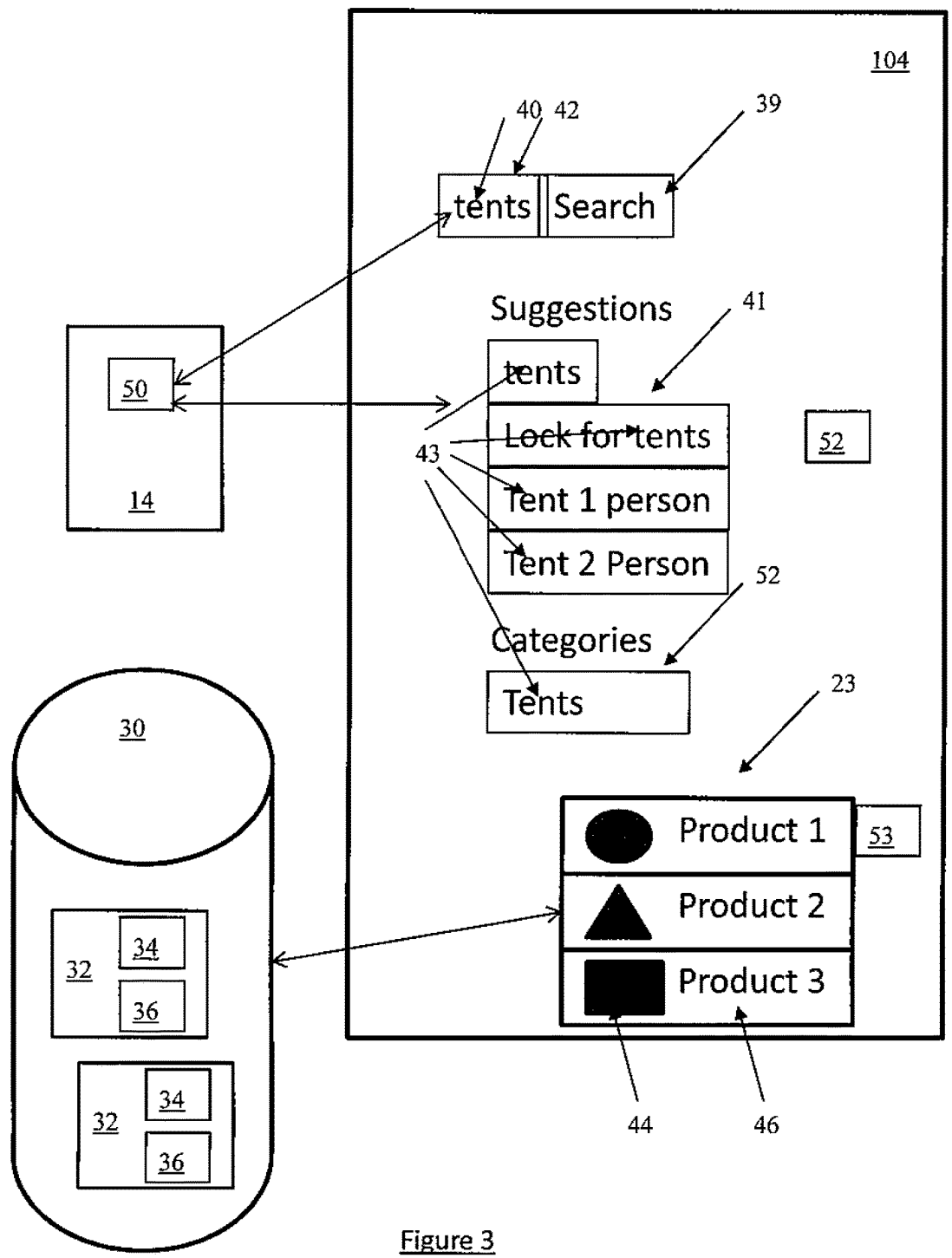
FIG. 3 shows a further operational example of the system of FIG. 1.

For example, the product summary link 23 of "Product 1" could be a direct link to an example tent contained within one of multiple product records 32 matching the search term "tents", the product summary link 23 of "Product 2" could be a direct link to an example Eureka tent contained within one of multiple product records 32 matching the search term "Eureka tent" and, the product summary link 23 of "Product 3" could be a direct link to an example Shelter contained within one of multiple product records 32 matching the search term "shelters". As such, the query responses 20 can be formatted by the product service 14 to include complete product records 32, offering word suggestions (e.g. search term suggestions 41) as the device 12 user is typing, selected/filtered product results (e.g. product summary links 23) and targeted category and/or attribute suggestions 52 that automatically update as a user scrolls through the search term suggestions 41 and/or as the user augments the query content 40 (e.g. progresses from text of "te" to "tent" to "tents" during entry of the query content 40 into the input field 42 of the user interface 104. For example, FIG. 3 is an example of dynamically updated search term suggestions 41 and resulting product summary links 23 based on the query content 40 changing from "ten" to "tents". A similar effect of dynamic update of the search term suggestions 41 (representing a change in user interface 104 content of that of FIG. 2 to that of FIG. 3) and resulting product summary links 23 can be effected by the user scrolling and selecting the search term suggestion 41 of "tents" in the Suggestions section of the user interface 104. For example, every letter added to the query content 40, as the user enters the letters into the user interface 104, can be interpreted and executed as a new query for submission to the search engine 24 to obtain updated product information 22 and/or compared against the product content 50 to ascertain matches representing updated search term suggestions 41. It is recognised that changes to the search term suggestions 41 would also be represented by corresponding changes to the product summary links 23. One example of the product content 50 is a collection of metadata descriptors contained in the metadata of the product records 32. Alternatively, the product service 14 could use the product records 32 themselves as the content upon which the query content 40 is compared in order to determine matching suggested search terms 41. For example, the product service 14 can interrogate the product records directly or could do so by passing the query content to the search engine 24 in order for the search engine to determine all metadata (and combinations thereof) matching the query content 40, for subsequent passing back to the product service for use in generating the suggested search terms 41 forwarded in the query response 20 back to the device 12. AS such, it is recognised that the suggested search terms 41 are selected from metadata related to the product records 32 of the product storage 30, and thus advantageously particularly relevant to the user as the suggested search terms 41 are focussed to match exactly similar terminology contained in the product records 32 themselves. Further, it is recognise that search log information (frequent search terms, popular items, related items, etc.) could be used to select/filter by the product service 14 a subset of all the suggested search terms 41 matching the metadata (e.g. product content 50) related to the product records 32 of the product storage 30.

The search term suggestions 41 can be selected by the product service 14 based on the product content 50 representing a collection of metadata also used to define the product records 32. Examples of the metadata can include data such as but not limited to product name, product brand, product category, product description, product location, related products, list of product features, etc. In this manner, the product service 14 can act as an intermediary between the network device 12 and the search engine 24.

It is recognised that the product summary links 23 and/or the suggested search terms 41 and/or product categories 52 can be selected by the product service 14 using the rules 25 (e.g. top categories based on frequency of searching, top products based on selection by users, etc.), as part of the content returned in the query response 20 to the device 12 for presentation on the user interface 104. The query response 20 could also contain links 52 relating to similar items (determined by way of search log or sales log content matching with the query content 40 and/or the suggested search terms 41. Also consider in the query response 20 could be graphical user action links/buttons 53 providing the user with the option to "Buy now", "Purchase", "Add to Cart" or "Check out" for a particular product represented by the summary product link 23.

For example, the product service 14 would receive the query content 40, compare the query content 40 against the metadata of the product content 50 (or product records 32 directly) in order to determine matching suggested search terms 41, apply those suggested search terms 41 to the search engine 24 in order to obtain search results 23 containing information 34,36, filter (e.g. most popular, most frequent) the search results 21 using the rule set 25 in order to select the representative product summary links 23 related to the suggested search terms 41 and then include the suggested search terms 41 and corresponding representative product summary links 23 as content of the query response 20 back to the device 12 for rendering on the user interface 104. Also included as part of the query response 20 content could be the graphical user action links/buttons 53 linked to the ability on the website 50 to guide the user through a purchase transaction of the product identified by the representative product summary link 23 selected by the user. As such, the user could be guided from entry of a portion of a search term in the input field 42 (see FIG. 2) and then immediately presented with an option to purchase a product, thus bypassing the steps of 1) entering and selecting the complete search term manually, 2) receiving a search result listing containing multiple listings with one of the listings being a link to the product, 3) reviewing the listings to select the relevant product listing therefrom, 4) clicking on selected product listing, and then 5) clicking on a purchase option (e.g. add to cart) for the product. As demonstrated, the ability of the system 10 to present representative product summary links 23 to the user on the user interface 104, before the user formally enters the respective full search term as the query content 40, provides for the ability of the system 10 to facilitate product purchase by the user. This facilitation can be enhanced in the case where the graphical user action links/buttons 53 are linked to the representative product summary links 23 on the user interface 104.

In one embodiment, the product summary links 23 can be defined using hypertext. The product summary links 23 can be referred to in general as a selectable connection from one word, picture, or information object to another. In a multimedia environment such as the Internet, such objects can include sound and motion video sequences. One example form of the product summary links 23 is a highlighted word or picture that can be selected by the user (with a mouse or in some other fashion on the user interface 104), resulting in the delivery and view of another file, i.e. the product record 32 obtained from the product storage 30. The highlighted object can be referred to as an anchor, such that the anchor reference and the object referred to constitute the product summary links 23. In Hypertext Markup Language (HTML), the anchor is the establishing of a term, phrase, image, or other information object as being either: the target of the hypertext product summary links 23 within a document (e.g. web page), or a reference (a product summary link 23 you can select) to such a target.

It is noted that any HTML file name can be automatically be part of the product summary links 23 as either the anchor or target that can be linked to. For example, the anchor within the file to which one can link directly is identified by a # symbol followed by the name, such that the # is used to take the device 12 user to a specific part of a referred page. Further, although most links do not offer the user a choice of types of link, it would be possible for the user to be provided a choice of link 23 types, such as but not limited to: a definition of the object, an example of the object, a picture of the object, a smaller or larger picture of the object, etc. Further, it is recognised that hypermedia can be used to extend the meaning of the product summary links 23 to include product summary links 23 among any set of multimedia objects, including sound, motion video, and virtual reality, for example. Hypermedia product summary links 23 can also connote an increased level of visitor/network interactivity than the interactivity already implicit in hypertext. It is recognised that the product summary links 23 can include link mechanisms such as but not limited to: Inline Text Links; Text Banners; Graphical/Rich Media Banners; In-page Graphical Banner; Pop-Unders/Ups; XML Feeds, for example.

In terms of products associated with product records 32, in economics, economic output is divided into goods and services. When an economic activity yields a valuable or useful thing, it can be known as production output of the totality of products (e.g. goods or services) in an economy that the company (e.g. provider of the product service 14) makes available for use by the user of the device 12.

Products as goods can range from a simple safety pin, food, clothing, computer components to complex aircraft. Products as services are the performance of any duties or work for another (e.g. helpful or professional activity) and can be used to define intangible specialized economic activities such as but not limited to: providing access to specific information; web services; transport; banking; legal advice; accounting advice; management consultant advice; and medical services. The company providing the products can be a businessperson/individual engaged in wholesale/retail trade, an organization, an administration, and/or a business that sells, administers, maintains, charges for or otherwise makes available product(s) that are desirable by the user. Accordingly, the company can be one person, or an association of persons, for the purpose of carrying on some enterprise or business; a corporation; a firm; etc. Further, it is recognised that the use of the product summary links 23 can be applied to direct the user to company activities not related to specific product(s), for example customer service, community activities, and/or sponsorships. These general activities of the company are also considered as part of the definition of company products.

It is also recognised that the product service 14 can modify search text contained in the query request 18 in order to generate a modified query request 19 (i.e. containing modified search text) that is forwarded to the search engine 24, as further described below, before the query request 19 is sent to the search engine 24, e.g. the search query 18 is not sent to the search engine 24 and instead the product service 14 modifies the search query 18 to produce the modified search query 19 which is then sent to the search engine 24, based on rules 25 available to the product service 14. It is recognised that the rules 25 contain knowledge of specific terms and phrases contained in the product information stored in the product index (e.g. records 32) of the storage 30. Accordingly when the product service obtains the query 18, the product service 14 analyzes the query 18 content (e.g. search term(s), search phrase(s), navigation term(s), navigation phrase(s)) against those contained in the rules 25 and when the query 18 content matches any of the rules 25, then the product service 14 modifies the query 18 content to generate augmented query 19,21 content (for subsequent consumption by the search engine 14)

Search engines 24 can be defined as programs (i.e. a set of computer processor executed instructions) that searches documents (e.g. contained in the product index) for specified keyword(s) (in the query 18,19) and returns (i.e. product information 22 for use in the query response 20) a list of the documents in which where the keyword(s) were found. The search engine 24 can be thought of as a general class of programs that facilitate users to search for product information 22 on the network 16.

The search engine 24 can be configured to work by sending out a spider to fetch/identify as many documents (records 32) as possible. Another program of the search engine 24, called an indexer, then reads these documents and creates the product index based on the words/phrases contained in each document. Each search engine 24 can use a proprietary algorithm that is augmented by the configuration data in conjunction with the product service 14, in order to create the indices such that, ideally, only meaningful results are returned for each query 19,21. The search results 23 returned by the search engine 24 in response to the query 19 can be presented in a line of results often referred to as search engine results pages (SERPs). The information can be a specialist in web pages, images, information and other types of files, as interpreted by the product service 14 via rules 25, 26 and then served up to the user as query response(s) 20 (e. including product records 32, summary product links 41, etc.). Some search engines 24 can also mine data available in databases or open directories. Unlike web directories, which can be maintained only by human editors, search engines 24 can also maintain real-time information by running an algorithm on a web crawler in order to keep the product index current in the storage 30. In one example, the search engine 24 can work by storing information about many web pages containing the product information 22 in the product index, which they retrieve from the HTML markup of the pages (e.g. as provided by the configuration data—i.e. template files). These pages can be retrieved by a crawler (sometimes also known as a spider), such as an automated crawler which follows every link of the product information 22 in the storage 30, for example related to product details as well as navigation details between the product details.

The search engine 24 can also analyze the contents of each page (or collection of text like a document) to determine how it should be indexed (for example, words can be extracted from the titles, page content, headings, or special fields called meta tags). Data about product information 22 is stored in the product index database 30 for use in later queries 19,21 processing. When the query 19,21 is received by the search engine 24 (typically by using keywords), the engine 24 examines its index and provides a listing of best-matching web pages (e.g. product information content 22) according to its configuration data, for example with a short summary containing the document's title and sometimes parts of the text as well as a representative product image. The index is built by the search engine 24 from the product information 22 stored with the data and the method by which the product information 22 is indexed according to the configuration data. It is recognised that the product index can also be referred to as a structured directory of topics.

Elastic search is another example of a search engine 24 for querying written words contained in the product information 22 organized by the Elastic search product index. Elastic search can perform tasks, such as wading through text, returning text similar to a given query 19,21 and/or statistical analyses of a corpus of text. More specifically, Elastic search can be considered as a standalone database server, written in Java, that takes data (product information 22) in and stores it in a sophisticated format (as defined by the configuration data) optimized for language based searches. As such, Elastic search can search the database 30 of retail products by description, finding similar text in a body of crawled web pages, or searching through posts on a blog, or other formats of the product information 22. Elastic search configured search engine 24 can pertain to the actual algorithms (i.e. set of computer processor implemented instructions) for matching text and storing optimized indexes of searchable terms.

In conjunction with the search engine 24, the product service 14 can use the rule set 25 to account for spell checking, synonyms, cross promotion of products based on identified search text within the query request 18, etc, in augmenting the query request 18 to generate the modified query request 19 (e.g. containing the suggested search terms 41). As such, the product service 14 can be exemplified as a proxy or bridge component positioned between the network devices 12 and the search engine 24, such that the product service 14 interacts with the search engine 24 on behalf of the network device 12. An example of the query request 18 of the network device 12 is a request for product information by a consumer from a merchant website 50

(shown by example in different ghosted view versions—see FIG. 1) making products available for sale in an ecommerce enterprise. As such, the query responses 20 could include pricing and optionally other purchase information (e.g. shipping details, payment instructions, etc.) of products detailed in the query responses 20. As further described below, the rules 25,26 can be configured and sent to the product service 14, for subsequent use in processing search queries 18 and product information 22, by an administration service 40. It is recognised that the network device 12 can be operated by a user wishing to access a merchant (e.g. ecommerce website) expressed by the product service 14.

Alternatively, the network device 12 can be operated by the ecommerce website that is in communication with the user (e.g. online shopper) wishing to access the merchant (e.g. ecommerce website), and as such the network device 12 forwards the query 18 on behalf of the user to the product service 14. In this example, it is the ecommerce website expressed by the network device 12 that is a intermediary between the product service 14 and online shoppers (not shown) accessing the ecommerce website in order to generate the search/navigation queries 18.

Further, the product service 14 can be considered as the client of the search engine 24, which is acting as the server of the network device 12 in their client-server relationship. Similarly, the network device 12 can be considered as the client of the product service 14 acting as the server in their client-server relationship. Similarly, the search engine 24 can be acting as the server with the product service 14 as the client in their client-server relationship. It is recognised that the physical server device 201 (see FIG. 5) of the product service 14 can be the same or different physical server device 201 of the search engine 24. In this manner, the system 10 includes a number of differentiated client and server roles in the ecommerce application for product information request and retrieval. For example, the client-server model of the system 10 can be defined as a distributed application structure that partitions tasks or workloads between the providers of a resource or service (e.g. query response 20, product information 22,21), called servers, and service requesters (e.g. query request 18,19 product information 22,21), called clients. The clients and servers can communicate over the computer network 16 on separate hardware, but both client and server can reside in the same system. A server host (e.g. computer device 201) can run one or more server programs which share their resources with clients. Also, the client can be defined as one that does not share any of its resources, but requests the server's content or service function (e.g. query response 20, product information 22,21). Clients therefore initiate communication sessions with servers which await incoming requests (e.g. query request 18,19 product information 22,21). The client-server characteristic can describe the relationship of cooperating programs in the ecommerce application. The server component can provide a function or service to one or many clients, which initiate requests for such services. As such, it is recognised that whether a computer device 12,201 is a client, a server, or both, is determined by the nature of the application that requires the service functions.

For example, a single computer device 12,201 can run web server and file server software at the same time to serve different data to clients making different kinds of requests. Client software can also communicate with server software within the same computer device 12,201. Communication between servers, such as to synchronize data, is sometimes called inter-server or server-to-server communication. Client-host and server-host can be defined differently than client and server. The host can be any computer device 12,201 connected to the network 16. Whereas the words server and client may refer either to a computer device 12,201 or to the client/server computer program.

In view of the cooperation between the product service 14 and the search engine 24, it is recognised that that the system 10 provides the ecommerce environment in which the network device 12 cannot always submit an unaltered query request 18 for receipt by the search engine 24 and the network device 12 cannot always receive an unaltered query response 20 from the search engine 24, as the product service 14 is interposed between the network device 12 and the search engine 24. Therefore, the product service 14 can be defined as a bridge (or proxy) that sits in front of the search engine 24 and intercepts search queries 18 (e.g. potentially modifies them as search queries 19 using rule data 25) and can also augment the search results 22 received from the search engine 24 with any format data 26 that are applicable in order to generate the query response 20. As mentioned above, the product service 14 can execute multiple search queries 18,19 in serial succession (e.g. as incremental searching) before deciding to process (e.g. via rules 25) the received product information 22, in response to one of the serially executed queries 18,19 (e.g. the last query in the series), and send back to the network device 12 as the query response 20. This can also be referred to as an one/initial search query 18 received by the product service 14 to a many search query 18,19 submitted to the search engine 24 by the product service 14 in response to receipt of the one initial search query 18 (i.e. a one to many example). An advantage of the product service 14 configured to execute multiple search queries 18,19 in a sequential series to the search engine 24, based on only a common query 18 originally received from the network device 12, is that bandwidth savings and increased response time can be realized by the ecommerce system 10 while at the same time providing for a better ecommerce user experience (of the network device 12). This better ecommerce user experience can be reflected in the user perceiving more relevant search results 20 returned to the user, as compared to waiting for the user to respond to each query response 20 (sent by the product service 14 to the network device 12) before sending another search query 18 (by the product service 14) to the search engine 24 without receipt beforehand of a different search query 18 from the network device 12. As such, it is recognised that the product summary links 23 represent individually executed searches done by the search engine 24 using the suggested search terms 41 determined by the product service 14.

The product service 14 can also receive a query 18 and decide not to send the query 18 to the search engine 24 and instead satisfy the query 18 itself using relevant product information 22 already in possession of the product service 14 (e.g. in local storage) that is now external to the product index (e.g. records 32). An example of the using product information 22 external to the search index is for navigation (e.g. the query 18 is a navigation query) of product information already received from the search engine 24 and stored in a local cache of the product service 14. A further example is where the product service 14 determines, via comparison of the query 18 contents against the rule set 25, that the query 18 can be satisfied using product information 22 external to the product index 32 (e.g. store location information, store hours, credit card or payment information, shipping information, etc.).

It is recognised that the storage 30 can be considered local as part of the website 50 hosted on one or more servers 201, and/or the storage 30 can be considered remote from the website 50 and hosted on one or more remote servers (not shown) accessible over the network 16.

In terms of the storage 30, the records 32 can be represented by a table of all the data feeds (containing data 34,36) as uploaded by the merchant (e.g. via the administration service 40) and processed by the search engine 32 with their status. For example, a status of Complete can mean that the data 34,36 has been ingested by the search engine 24, stored in the storage 30 and can also mean that the data 34,36 has been organized as a series of records 32 that have been added to the index and ready to be searched by the search engine 24. A way for the administration service 40 to check that the uploaded data 34,36 is in the search index associated with the search engine 24 and the storage 30 is to test query for something specific in the newly uploaded data 34,36 now represented as searchable and indexed records 32.

It is recognised that a master record 32 can be defined as representing a generic version of a product, e.g. having metadata description 34 and an image 36 that is the "default" form of the product the master record 32 represents. For example, when the product comes in multiple colors or styles, these combinations can be considered of the type 'variant'. As such, master records 32 exist in a "master" sub-collection as categorized in the complete dataset of records 32 stored in the storage 30 as accessible and searchable by the search engine 24, based on the search text or modified search text of the search query 18,19 received from the product service 14. Further, a variant record 32 (typically multiple records 32 for a particular product that has only one master record 32) can be considered as the children of the 'master' records 32. The variant records 32 represent the various different combinations of attributes that are possible of their master record 32, such as the blue version of a shirt that comes in many colors (each of the colours will be a variant record 32 with its own metadata descriptors 34 and representative image 36 while the master record 32 will have a generic metadata description 34 of the product and a generic image 36 of the product. This variant record 32 will be placed in the "variant" sub-collection as categorized in the complete dataset of records 32 stored in the storage 30 as accessible and searchable by the search engine 24, based on the search text or modified search text of the search query 18,19 received from the product service 14. A further type of record 32 can be a unique record type that has no children and no master, as the unique record 32 only comes in one form (e.g. there is only one version of the product). This unique record 32 can be placed in both the "master" and "variant" sub-collections as categorized in the complete dataset of records 32 stored in the storage 30 as accessible and searchable by the search engine 24, based on the search text or modified search text of the search query 18,19 received from the product service 14. As such, it is recognised that the suggested search terms 41 can be selected by the product service 14 using the product content 50 containing information about master and variant records 32. For example, some of the suggested search terms 41 can be metadata obtained from one or more variant records 32 matching the query content 40. For example, some of the suggested search terms 41 can be metadata obtained from one or more master records 32 matching the query content 40.

As such, the search engine 24 searches the object records 32 of the storage 30 using the search text (or modified search text), hereafter referred to generically as search data, of the search query 18,19 and compares the search data to the descriptive metadata 34 of the various object records 32 in order to determine the product data 21 matching the search data. Based on the search results product data, the search engine 24 uses configuration data (e.g. containing biasing logic, dynamic navigation logic, etc. pertinent to providing relevant search results to the user) to assist in ranking the product data to produce the resultant product information 22, which contains a ranked order of multiple search hits from the storage 30 including paired text 34 and image 36 data from each of the matching object records 32.

Also included in the system 10 is the administration service 40 used to generate the configuration data to incorporate ecommerce related functionality to the searching algorithm of the search engine 24 including ecommerce related functionality such as but not limited to: dynamic navigation; biasing; as well as spell corrections specific to the descriptive metadata 34 of the products and synonyms specific to the descriptive metadata 34 of the products. The administration service 40 can also be used to generate the rule data 25,26 used by the product service 14. As such, the configuration data of the search engine 24 is used to modify operation of the search engine 24 by adjusting the ranking algorithm, dynamic navigation, biasing, and any other functional operations that affect the content of the product information 22 for ecommerce purposes (e.g. provides content useful to the user of the network device 12 such that the query response 20 includes product information 22 deemed relevant to the user based on their intended product information desired as expressed by their search text submitted in the query request 18 by the network device 12.

It is recognised that the rules 25,26 can be created by a business user of the administration service 40 that utilizes page templates and controls when and where record content is surfaced. These rules 25,26 can be triggered from both search and navigation states (e.g. a result of receiving a search query 18 or a navigation query 18 from the network device 12) as well as events such as having no results. A rule can contain one or more of the following elements, by example: Name—The name assigned the particular rule. An example might be "PS3 Upsell"; Triggers—a trigger is a search and navigation state definition of the query 18 that triggers a rule because they determine where a rule will fire. The trigger types can be used to give the ability/flexibility to the system 10 to cross-sell and/or upsell (i.e. add into the search results 20,22 via the suggested search terms 41 those content records 32 that would not have been matched strictly by the original search text provided in the query 18 sent by the network device 12) at intersections of data that is supported by the content and categorization of the product records 32 in the storage 30 as accessed by the search engine 24. To add a trigger, one can chose from trigger types such as but not limited to: 1) Search—A search state that triggers a rule. For example, if a user searches for "PS3", you may want to have that search trigger a rule that generates via the suggested search terms 41 to take the user to a rich landing page with a banner featuring a new game for the PlayStation 3, and upsells of related PS3 products on the side, such as headphones, or game controllers. The search box takes a comma separated list of values that can all trigger the rule; 2) Navigation—This rule can be triggered during a navigation state. For example, if a user navigates by $200-400, then a you might want this rule to fire via the suggested search terms 41; 3) No Results Event—In the event an item is misspelled, for example, and no results are shown, you can have a rule in place to redirect a user to another page to assist them in their search via the suggested search terms 41; 4) No Navigation Event—In an event where there is no dynamic navigation on the left hand side, you may want to use this additional retail space as an opportunity to upsell via the suggested search terms 41; 5) Custom URL Parameter—provides you to fire a rule based on any piece of information that it can pass rules through the rule engine of the product service 14. For example, if you know that a user is signed in, and is a high net worth client, then they can make this rule fire exclusively for high net worth clients via the suggested search terms 41. This trigger can provide you to do anything you'd like above and beyond the normal operations of the search engine 24.

Further rules 25,26 can be used to modify the suggested search terms 41 and/or the product information 22 received and now it is used to generate the content of the results query 20 and/or can be used to modify the search query 18 to produce the modified query 19. One rule type provides for aspect(s) of the query 18 to be rewritten by the product service 14 before a search request 19 is made to the search engine 24, based on the suggested search terms 41. Another rule is Phrases—Create auto-quoted phrases to help the user get to a specific set of results via the suggested search terms 41. Another rule is Redirect—Search terms can be intercepted, and users re-directed to appropriate pages via the suggested search terms 41. For example, a search for "shipping" will redirect the user to the shipping details page, as opposed to a results page for products with the word "shipping" such as shipping labels. Another rule is Spelling—intercept a user's search by overriding specific words that don't come out of the box with the search engine 24 via the suggested search terms 41. Another rule is Synonyms—Search terms can be expanded by adding one-way synonyms, or two-way synonyms via the suggested search terms 41. One-Way Synonym: In this query, a search for computers will expand to laptops, which will inhibit results for computers surfacing when a user searches for laptops via the suggested search terms 41. Two-Way Synonym: In this query rewrite, a search for "PS3" would get expanded to "PlayStation 3" and vice versa via the suggested search terms 41.

Further rules 25,26 can be an Autobucket rule set used by the product service 14 to allow it to automatically create and manage refinement value ranges from data feeds (e.g. product information 22) via the suggested search terms 41. Autobucket rule set when triggered processes the full set of data 22 to figure out how the numeric data should be bucketed via the suggested search terms 41. Autobucket can scan the input data 22 and determine what buckets should be created for the numeric fields to be included in the content of the response query 20. For example, if you have price data that ranges from $1.00 to $10,000.00, Autobucket can create a number of buckets from $0-$10,000. The number and granularity of the buckets can depend on the distribution of the price data in the product information 22 via the suggested search terms 41. For example, if the price data is most dense in the range 0-100, more buckets can be created in that range and fewer higher up the range as configured by the Autobucket rule set definitions/rules.

Further rules 25,26 can be an Autonav rule set used by the product service 14 to determine what refinements to display (on user interface 104) at which points in the user experience via the suggested search terms 41. The system can learn what to show based on a specified refinement via the suggested search terms 41. This refinement can be referred to as the keystone navigation. For example, if you have a property called Category_level_1 on your records 32, autonav can identify this is the 'keystone' value. Autonav rule set can configure the product service 14 to scan through all the records 32 in the incoming data directory and figure out what dynamic navigation should show up for each of the values in Category_level_1 via the suggested search terms 41. As such, the product service 14 can support dynamic navigation which can helps users refine products displayed on the user interface 104 through intelligent (as dictated by the Autonav rule set) and automated filtering via the suggested search terms 41.

The refinements to the query content 40 as represented by the suggested search terms 41 can be Brand, Department, Price and On Sale. Each refinement has a set of refinement values defined in the rules 25,26 that users can select to further refine the search results 20, as implemented by the product service 14 in comparison of the selected refinements of the query 18 (e.g. navigation query). For example, the Department refinement 80 has refinement values of Accessories, Appliance, Auto, etc.

Further rules 25,26 can be for the specification of one numeric product attribute (e.g. price, average rating) to make sortable/filterable. The search engine 24 can sort on relevancy and date via the suggested search terms 41. Behind the scenes, the product service 14 is using the specified numeric field as a date so the search engine 24 can sort on it via the suggested search terms 41. The end result is that websites 50 can sort on relevancy or one numeric product. Using this method/rule set can have performance implications as it can instruct the bridge to fire two queries.

As such, it is recognised that the product service 14 can modify the received query 18 (e.g. search query, navigation query, etc.) in a number of different ways. For example, when the query 18 comes in, the product service 18 looks at it, and if an area of the query content is specified in the rules 25 (e.g. in comparison of the query content with the rules of the rule set 25), then the product service modifies the query 18 content as the modified query 19 to use a specific front end (e.g. set of configuration data and associated interpretation and implementation of the modified query 19 against the product index of the records 32 stored in the storage 30) that is created by the configuration data upload provided to the search engine 24 and ultimately to the user interface 104 of the device 12 as the suggested search terms 41. Another example is biasing, such that when the query 18 comes in, the product service 14 looks for any biasing profile name(s) in the query 18 content, in comparison of with the rules 25 for matching biasing name words or phrases, and then modifies the query 18 content (as defined by the rules 25) to match the name of the biasing profile defined in the search engine 24 by the configuration data upload in order to generate the suggested search terms 41. In other words, the biasing related text (e.g. words, phrases) submitted by the user in the query 18 content may not match the specific biasing text labels/names recognised by the search engine 24 via its configuration data 38 (e.g. biasing names/labels associated with specific actions specifying application or return results of the modified query 19 content). Another example is Product Data, such that example data files (e.g. records 32) represented in the product index of the storage 30 can be Comma Separated Value (CSV) files, Google Commerce Search (GCS) files, etc. The files 32 can be grouped into a flat directory and a product data processing tool (as hosted by the administration service 40) can process the files by using the file templates. For example, the template file (e.g. configuration data can be used by the data processing tool to format the (e.g. HTML) body of the product description that is sent along with each product record to the search engine 24 to be incorporated as part of the product index in the storage 30. The template file can be used to format what the product detail page would look like to the search engine 24 and thereby assist in constructing the product index by the search engine 24 as well as helping the search engine 24 with relevancy of the individual template processed records 32 when evaluating them against the contents of the modified query 19 represented by the suggested search terms 41. The template files can include template (defaultTemplate.vm) to reflect the attribute (e.g. master/variant data differentiation as well as title and description data) in the product information 22 represented in the product index.

A further example is another method performed by the product service 14 (as expressed in the rule set 25) to instruct the product service 14 to fire multiple queries 19 based on the suggested search terms 41 generated from the original query content 40 (i.e. in response to comparison of the query 18 content to the rules of the rule set 25 in conjunction with the metadata of the product content 50).

Further to the above, the set of stored rules 25 can optionally include a rule to dynamically change ranking relevance of the suggested search terms 41. Also, for received search results 21 from the executed suggested search terms 41, the product service 14 can use the rules 25 to dynamically change the ranking relevance of two or more of the individual product listings represented by the summary product links 23 with respect to one another according to a relevance rule selected from the group consisting of: biasing of one product type over another; overriding result order of the individual product listings; changing how navigation of the individual product listings are ordered and displayed. These dynamic changes are implemented based on whether certain rules of the rule set 25 are triggered (or not) when the search results 21 are compared to the rule set 25 by the product service 14. For example, each of the product listings and/or a group of the product listings of the search results 21 can be compared on a rule by rule basis of the rules contained in the rule set 25. Those product listing(s) matching one or more of the rules provide instructions for the product service 14 in order to implement the functionality expressed by the matching rule(s) in order to select which of the products represented in the search results 21 should be selected as a subset of the products to be put into the summary product links 23 selected for display on the user interface 140 by being included in the query response 20.

The ecommerce enabled system 10 uses the communications network 16 to facilitate communication between the network devices 12 (hosting a query enabled client application 200 such as a web browser), the product service 14, the search engine 24, the administration service 40 and/or storage 30. Preferably, the communications network 16 can be a wide area network such as the Internet, however the network 16 may also comprise one or more local area networks 16. Further, the network 16 need not be a land-based network, but instead may comprise a wireless network and/or a hybrid of a land-based network and a wireless network for enhanced communications flexibility. One example is where the communications network 16 includes a local area network 16 segment (e.g. wired, wireless, etc. on which the network device 12 is registered, communicates on) and a wide area network 16 segment (e.g. the Internet on which the product service 14 is addressed) to which the local area network 16 is connected to. It is also recognised that the product service 14 and the search engine 24 can be coupled via a network 16 when on different machines 201 (e.g. a local or wide area network 16 as desired).

Each network device 12 typically comprises a land-based network-enabled personal computer. However, the invention is not limited for use with personal computers. For instance, one or more of the network devices 12 can comprise a wireless communications device, such as a wireless-enabled personal data assistant, a tablet, or e-mail-enabled mobile telephone if the network 16 is configured to facilitate wireless data communication. The network device 12 is capable of supplying geographical location information of itself to the system 10 in the communication 18 to request product details of the storage 30 as facilitated via interaction between the product service 14 and the search engine 24. The user of the network device 12 can provide its geographical coordinates through any suitable mechanism known to those skilled in the art, including latitude/longitude coordinates, GPS, and wireless triangulation. Other methods of obtaining geographical coordinates may also includes Wi-Fi based services. Further, the location information can be in the form of geographical coordinate data, such as, for example, Global Positioning System ("GPS") coordinate data specifying latitude, longitude and elevation. In some embodiments, the location information may comprise the GPS satellite network and the location information via a GPS transceiver for obtaining GPS coordinate data.

Figure 4:
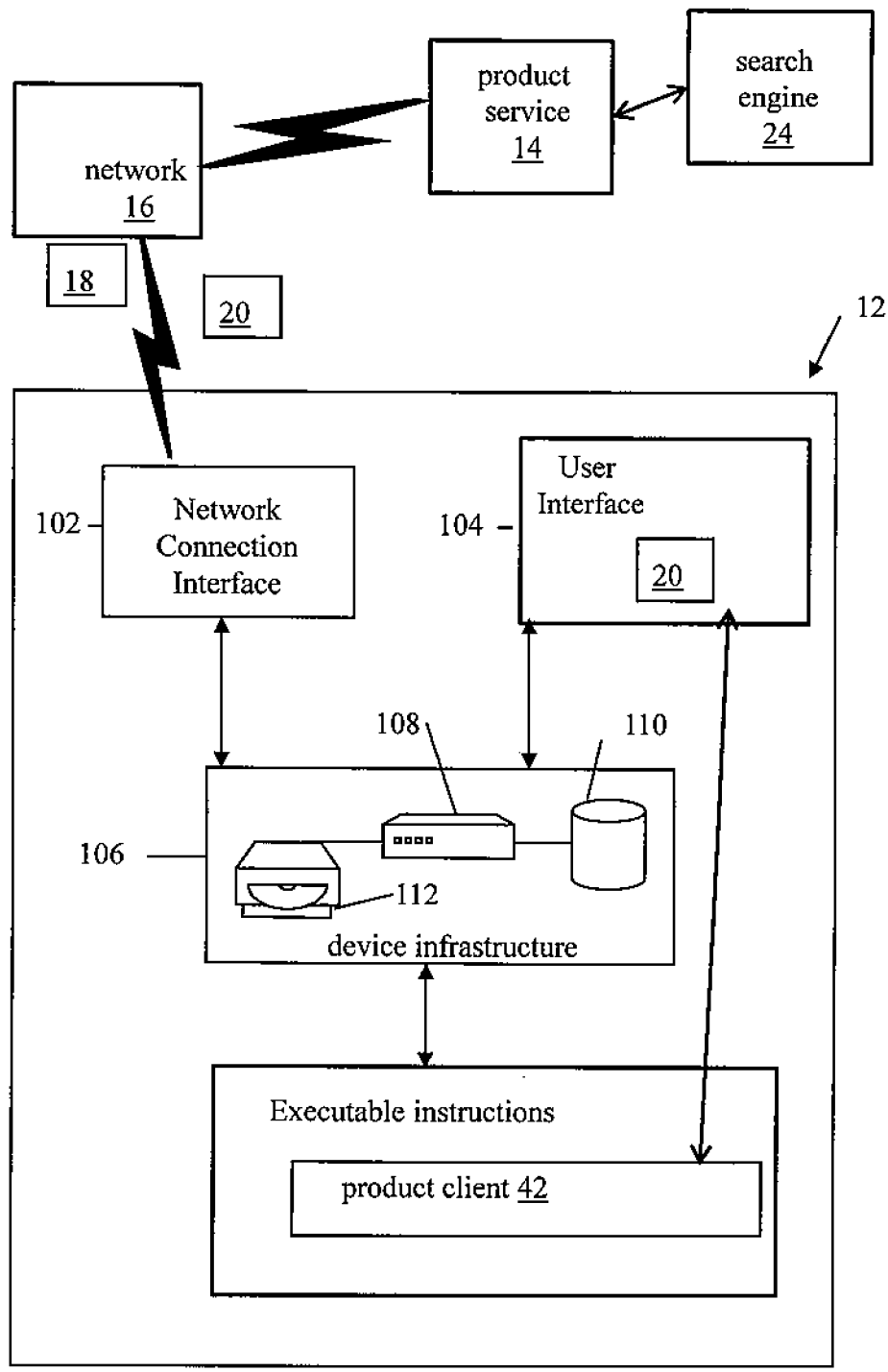
FIG. 4 is an example configuration of a network device of the system of FIG. 1.

As shown in FIG. 4, the network device 12 comprises a network interface 102, the user interface 104, and a data processing system 106 in communication with the network interface 102 and the user interface 104. Typically, the network interface 102 comprises an Ethernet network circuit card, however the network interface 102 may also comprise an RF antenna for wireless communication over the communications network 16. Preferably, the user interface 104 comprises a data entry device (such as keyboard, microphone or writing tablet), and a display device (such as a CRT or LCD display). The data processing system 106 includes a central processing unit (CPU) 108, and a non-volatile memory storage device (DISC) 110 (such as a magnetic disc memory or electronic memory) and a read/write memory (RAM) 112 both in communication with the CPU 108. The DISC 110 includes data which, when loaded into the RAM 112, comprise processor instructions for the CPU 108 which define memory objects for allowing the network device 12 to communicate with the product service 14 over the communications network 16.

In view of the above descriptions of storage 30 (and other local device storage used to store the rules 25,26 and/or configuration data 38), the storage 30 can be configured as keeping the stored data (e.g. records 32) in order and the principal (or only) operations on the stored data are the addition of and removal of the stored data from the storage (e.g. FIFO, FIAO, etc.). For example, the storage can be a linear data structure for containing and subsequent accessing of the stored data and/or can be a non-linear data structure for containing and subsequent accessing of the stored data. Further, the storage receives various entities such as data that are stored and held to be processed later. In these contexts, the storage can perform the function of a buffer, which is a region of memory used to temporarily hold data while it is being moved from one place to another (i.e. between the services 14,40,24 and/or towards the network device 12). Typically, the data is stored in the memory when moving the data between processes within/between one or more computers. It is recognised that the storage can be implemented in hardware, software, or a combination thereof. The storage is used in the network system 10 when there is a difference between the rate/time at which data is received and the rate/time at which the data can be processed.

Further, it will be understood by a person skilled in the art that the memory/storage described herein is the place where data can be held in an electromagnetic or optical form for access by the computer processors/modules. There can be two general usages: first, memory is frequently used to mean the devices and data connected to the computer through input/output operations such as hard disk and tape systems and other forms of storage not including computer memory and other in-computer storage. Second, in a more formal usage, memory/storage has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of memory as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage can also be defined as an electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

In terms of a server, it is recognised that the server 201 as host for the product service 14, search engine 24 and/or administration service 40 can be configured as hardware, software, or typically a combination of both hardware and software to provide a network entity that operates as a socket listener. It is recognised that any computerised process that shares a resource (e.g. data) to one or more client processes can be classified as a server in the network system 10. The term server can also be generalized to describe a host that is deployed to execute one or more such programs, such that the host can be one or more configured computers that link other computers or electronic devices together via the network 16. The server(s) 201 can provide specialized services across the network 16, for example to private users inside a large organization or to public users via the Internet 16. In the network system 10, the servers can have dedicated functionality and/or can share functionality as described. Enterprise servers are servers that are used in a business context and can be run on/by any capable computer hardware. In the hardware sense, the word server typically designates computer models intended for running software applications under the heavy demand of a network 16 environment. In this client-server configuration one or more machines, either a computer or a computer appliance, share information with each other with one acting as a host for the other. While nearly any personal computer is capable of acting as a network server, a dedicated server will contain features making it more suitable for production environments. These features may include a faster CPU, increased high-performance RAM, and typically more than one large hard drive. More obvious distinctions include marked redundancy in power supplies, network connections, and even the servers themselves.

Figure 5:
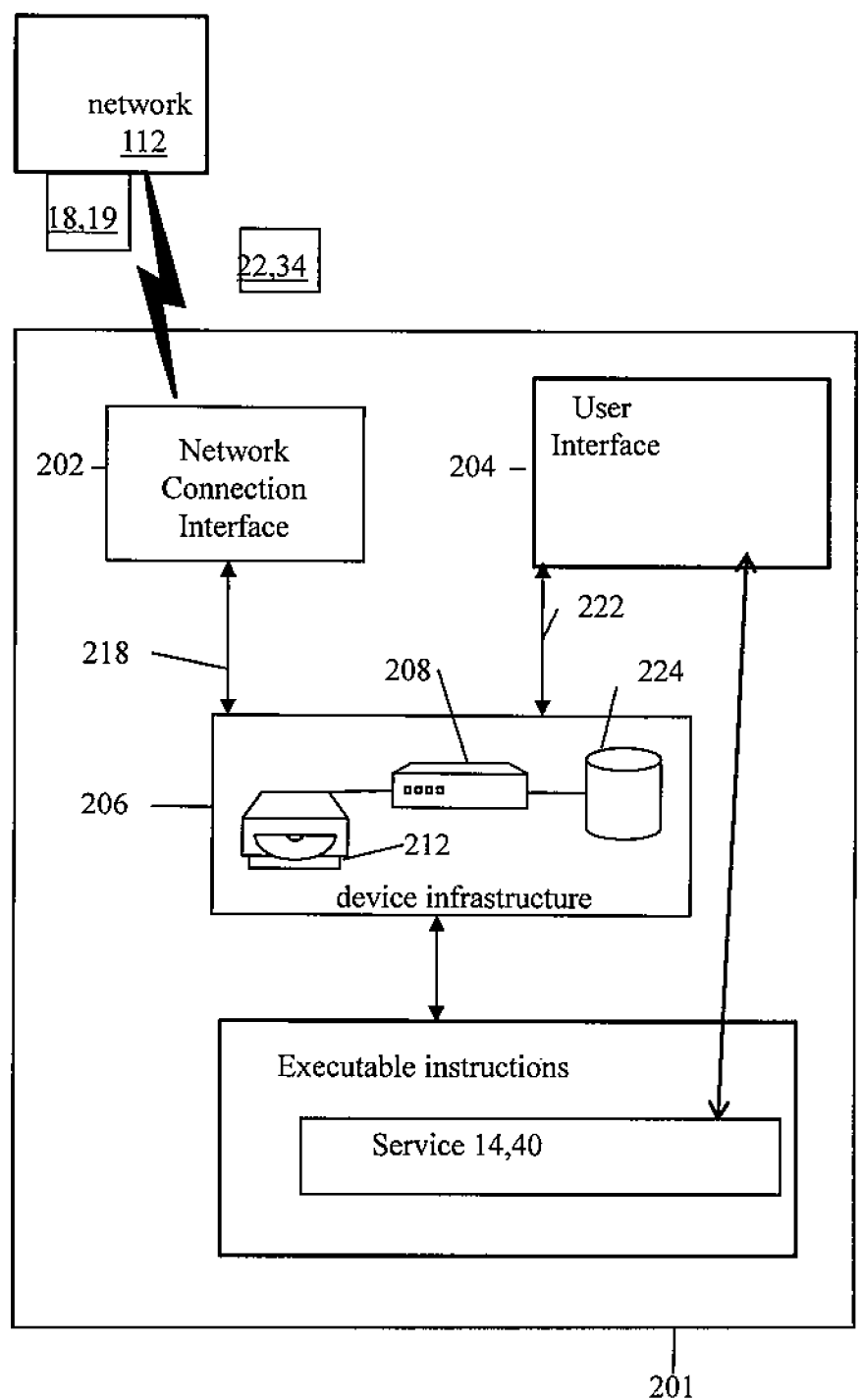
FIG. 5 is an example configuration of a network server of the system of FIG. 1.

Referring to FIG. 5, a computing device 201 of the service 14,40 can include a network connection interface 202, such as a network interface card or a modem, coupled via connection 218 to a device infrastructure 206. The connection interface 202 is connectable during operation of the devices to the network 16 (e.g. an intranet and/or an extranet such as the Internet), which enables the devices to communicate with each other (e.g. that of servers 201 with respect to one another and the devices 12) as appropriate. The network 16 can support the communications 18,19,20,22 and the related content.

Referring again to FIG. 5, the device 201 can also have a user interface 204, coupled to the device infrastructure 206 by connection 222, to interact with a user (e.g. server administrator—not shown). The user interface 204 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 206. Referring again to FIG. 5, operation of the device 201 is facilitated by the device infrastructure 206. The device infrastructure 206 includes one or more computer processors 208 and can include an associated memory (e.g. a random access memory 224). The computer processor 208 facilitates performance of the device 201 configured for the intended task (e.g. of the respective module(s) of the service 14,40) through operation of the network interface 202, the user interface 204 and other application programs/hardware of the device 201 by executing task related instructions. These task related instructions can be provided by an operating system, and/or software applications located in the memory, and/or by operability that is configured into the electronic/digital circuitry of the processor(s) 208 designed to perform the specific task(s). Further, it is recognized that the device infrastructure 206 can include a computer readable storage medium 212 coupled to the processor 208 for providing instructions to the processor 208 and/or to load/update the instructions. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid-state memory card, or RAM provided in the memory module 212. It should be noted that the above listed example computer readable mediums 212 can be used either alone or in combination.

Further, it is recognized that the computing device 201 can include the executable applications comprising code or machine readable instructions for implementing predetermined functions/operations including those of an operating system and the service 14,40 modules, for example. The processor 208 as used herein is a configured device and/or set of machine-readable instructions for performing operations as described by example above. As used herein, the processor 208 may comprise any one or combination of, hardware, firmware, and/or software. The processor 208 acts upon information by manipulating, analyzing, modifying, converting or transmitting information for use by an executable procedure or an information device, and/or by routing the information with respect to an output device. The processor 208 may use or comprise the capabilities of a controller or microprocessor, for example. Accordingly, any of the functionality of the service 14,40 (e.g. modules) may be implemented in hardware, software or a combination of both. Accordingly, the use of a processor 208 as a device and/or as a set of machine-readable instructions is hereafter referred to generically as a processor/module for sake of simplicity. Further, it is recognised that the service 14,40 can include one or more of the computing devices 201 (comprising hardware and/or software) for implementing the modules, as desired. It will be understood in view of the above that the computing devices 201 of the service 14,40 can be, although depicted as a single computer system, may be implemented as a network of computer processors, as desired.

What is claimed is:

1. A method for optimizing identification and access to a plurality of product records in a product database, the method executed as a set of stored instructions by a computer processor to implement the steps of:
   receiving over a communications network textual information comprising a sequence of characters;
   searching a collection of product metadata for words or phrases that comprise the sequence of characters as a portion thereof, the collection of product metadata comprising words or phrases describing products from one or more of the plurality of product records in the product database;
   executing a search query against the set of product listings using one or more of said words or phrases determined from searching the collection of product metadata comprising words or phrases describing products to return a query search result containing a plurality of product listings matching the search query;
   selecting a product listing subset from the query search result comprising at least one product listing from the query search result;
   sending over the communications network the product listing subset for display on a user interface as a list of user selectable links, each of the user selectable links in the list for each said product listing coupled to a respective product record of the product records; and
   receiving over the communications network a link selection from the list of user selectable links and returning the respective product record associated with the link selection.

2. The method of claim 1 further comprising the steps of, prior to receiving the link selection:
   receiving a content update to the textual information defining an updated sequence of characters;
   searching the collection of product metadata for words or phrases that comprise the updated sequence of characters as a portion thereof;
   executing an updated search query against the set of product listings using one or more of said words or phrases determined from searching the collection of product metadata to return an updated query search result containing an updated plurality of product listings matching the updated search query;
   selecting an updated product listing subset from the updated query search result;
   sending over the communications network the updated product listing subset for replacing on the display the list of user selectable links with an updated list of user selectable links, each of the user selectable links in the updated list for each said product listing in the updated product listing subset coupled to a respective product record of the product records; and
   receiving over the communications network said link selection from the updated list of user selectable links and returning the respective product record associated with said link selection.

3. The method according to claim 1, wherein said each product listing in the product listing subset contains a product image obtained from the respective product record.

4. The method according to claim 3, wherein the respective product record is displayed with a shopping cart selection.

5. The method of claim 3 further comprising the step of:
   providing a selection containing one or more variants in said each product listing in the product listing subset, the variants included in the product database.

6. The method of claim 5, wherein the selection is a user selectable link coupled to a respective one or more product records for the one or more variants.

7. The method of claim 6, wherein the user selectable link contains a variant product image different from the product image.

8. The method according to claim 1 further comprising the step of:
   processing the sequence of characters to determine a plurality of product categories to which the sequence of characters belong;
   assigning said each product listing to one or more of the plurality of product categories; and
   including in the product listing subset the assignment of said each product listing to the one or more of the plurality of product categories.

9. The method of claim 8 further comprising the step of including the one or more of said words or phrases in the collection of product metadata with the product listing subset for display on the user interface as a set of executable query search terms for use in interrogating the product database to return a subsequent query search result containing a corresponding plurality of product listings matching the subsequent search query.

10. The method of claim 9 further comprising the steps of:
   receiving a selected search term from the set of executable query search terms; and updating the plurality of product categories and the assignment of said each product listing to the updated plurality of product categories of said each product listing in the product listing subset to reflect the selected search term.

11. The method of claim 1 further comprising the step of including the one or more of said words or phrases in the collection of product metadata with the product listing subset for display on the user interface as a set of executable query search terms for use in interrogating the product database to return a subsequent query search result containing a corresponding plurality of product listings matching the subsequent search query.

12. The method of claim 11 further comprising the steps of:
receiving a selected search term from the set of executable query search terms; and updating content of said each product listing in the product listing subset to reflect the selected search term.

13. The method of claim 1 further comprising the step of: preprocessing the sequence of characters to correct for spelling errors based on a list of word misspellings associated with the collection of product metadata.

14. The method of claim 1 further comprising the step of: selecting the product listing subset from the query search result by filtering the plurality of product listings matching the search query by a filter parameter.

15. The method of claim 14, wherein the filter parameter is selected from the group consisting of: an indicated product category; an indicated product; popularity rating of each of the plurality of product listings; selection frequency of each of the plurality of product listings; and a synonym of the sequence of characters.

* * * * *